United States Patent [19]

Khan et al.

US005234469A

[11] Patent Number: 5,234,469

[45] Date of Patent: Aug. 10, 1993

[54] PROCESS FOR DISPOSING OF SEWAGE SLUDGE

[75] Inventors: Motasimur R. Khan; Matthew A. McMahon, both of Wappingers Falls; Christine C. Albert, Peekskill; Ronald J. McKeon, Beacon; Stephen J. DeCanio, Montgomery, all of N.Y.

[73] Assignee: Texaco Inc., White Plains, N.Y.

[21] Appl. No.: 722,819

[22] Filed: Jun. 28, 1991

[51] Int. Cl.$^5$ ............................................. C10J 3/46
[52] U.S. Cl. .............................. 48/197 R; 48/197 A; 48/209; 48/DIG. 7; 48/206; 110/346; 210/758
[58] Field of Search ................. 48/197 R, 197 A, 202, 48/206, 209, DIG. 7, 198.1; 252/373; 44/605, 280, 281, 282; 210/769, 774, 603, 761, 758, 764; 110/341, 342, 346, 397, 348; 60/39.02

[56] References Cited

U.S. PATENT DOCUMENTS

| | | | |
|---|---|---|---|
| 3,232,728 | 2/1966 | Reynolds | 48/215 |
| 3,524,630 | 8/1970 | Marion | 261/76 |
| 3,687,646 | 8/1972 | Brent et al. | 48/209 |
| 3,847,564 | 11/1974 | Marion et al. | 48/95 |
| 4,052,176 | 10/1977 | Child et al. | 55/32 |
| 4,443,230 | 4/1984 | Stellaccio | 48/DIG. 7 |
| 4,525,175 | 6/1985 | Stellaccio | 48/86 |
| 4,749,381 | 6/1988 | Yaghmail et al. | 44/280 |
| 4,762,527 | 8/1988 | Beshore et al. | 44/60 J |
| 4,775,388 | 10/1988 | Beshore | 44/605 |
| 4,801,307 | 1/1989 | Muenger et al. | 48/69 |
| 4,933,086 | 6/1990 | McMahon et al. | 48/197 A |
| 4,983,296 | 1/1991 | McMahon et al. | 48/197 A |
| 5,008,023 | 4/1991 | Carlen et al. | 210/764 |

FOREIGN PATENT DOCUMENTS

| | | | |
|---|---|---|---|
| 3046146 | 7/1982 | Fed. Rep. of Germany | 210/769 |
| 0223430 | 12/1983 | Japan | 44/280 |
| 63-283799 | 11/1988 | Japan | 210/769 |

OTHER PUBLICATIONS

*Perry's Chemical Engineers' Handbook,* McGraw-Hill, Fourth Edition, 1963, pp. 19–50.

*Primary Examiner*—Peter Kratz
*Attorney, Agent, or Firm*—James J. O'Loughlin; Albert Brent

[57] ABSTRACT

A process for disposing of sewage sludge comprising the steps of, (1) dewatering the sewage sludge to produce an aqueous slurry of sewage sludge having a solids content of about 10 to 50 wt. %; (2) heating and mildly shearing said dewatered sewage sludge at about 150° F. to 210° F. in the absence of air for 3 seconds to 60 minutes by a rotor/mixer at a speed of about 15 to 1000 r.p.m., thereby producing a pumpable slurry having a viscosity of less than about 2500 centipoise; (3) mixing at a temperature in the range of about ambient to 200° F. the slurry of sewage sludge from (2) with a supplemental fuel to produce a pumpable slurry of sewage sludge and supplemental fuel having a solids content in the range of about 50 to 65 wt. % and a higher heating value in the range of about 6,000 to 18,000 BTU/LB; and (4) burning said pumpable slurry from (3) in a partial oxidation gasifier, furnace, boiler, or incinerator to produce an effluent gas stream. In a preferred embodiment, the effluent gas stream is cleaned and purified and non-contaminating ash and slag are separated. By this process, noxious sewage sludge may be disposed of without contaminating the environment.

9 Claims, No Drawings

PROCESS FOR DISPOSING OF SEWAGE SLUDGE

FIELD OF THE INVENTION

This invention relates to an environmentally-safe process for disposing of sewage sludge.

Sewage sludge may be gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which dewatered sewage sludge is simultaneously heated and mildly sheared at a temperature in the range of about 150° F. to 210° F. in the absence of air and then mixed with a liquid hydrocarbonaceous fuel and/or a solid carbonaceous fuel e.g. coal and/or petroleum coke at a temperature in the range of about ambient to 200° F. to produce a pumpable slurry having a solids content in the range of about 50 to 65 wt. %. Costly hydrothermal pretreatment and/or extensive shearing of the sewage sludge has been avoided by the subject improved process. The pumpable slurry may be burned as fuel in a partial oxidation gasifier, furnace, boiler, or incinerator.

SUMMARY OF THE INVENTION

This invention pertains to an improved process for disposing of sewage sludge comprising:

(1) dewatering an aqueous slurry of sewage sludge having a solids content of at least 3 wt. % to produce an aqueous slurry of sewage sludge having a solids content in the range of about 10 to 50 wt. %;

(2) simultaneously, heating and mildly shearing the aqueous slurry of sewage sludge from (1) at a temperature in the range of about 150° F. to 210° F. in the absence of air for a period in the range of about 3 seconds to 60 minutes by means of a rotor/mixer having a speed in the range of about 15 to 1000 rpm, thereby producing a pumpable slurry of sewage sludge having a viscosity of less than about 2500 centipoise at 180° F.;

(3) mixing at a temperature in the range of about ambient to 200° F. the pumpable slurry of sewage sludge from (2) with a supplemental fuel selected from the group consisting of solid carbonaceous fuel having a solids content of about 77 to 100 wt. %, an aqueous slurry of solid carbonaceous fuel having a solids content in the range of about 45 to 80 wt. %, a liquid hydrocarbonaceous material, and mixtures thereof; wherein a pumpable slurry of sewage sludge and said supplemental fuel is produced having a solids content in the range of about 50 to 65 wt. % and a higher heating value in the range of about 6,000 to 18,000 BTU/LB; and (4) burning said pumpable slurry from (3) in a partial oxidation gasifier, furnace, boiler, or incinerator.

In a preferred embodiment to avoid contaminating the environment, the effluent gas stream is cleaned and purified and non-contaminating ash and slag are separated from the stream of gases.

DESCRIPTION OF THE INVENTION

With landfills closing, ocean dumping being curtailed, and high-technology incinerators becoming unpopular in many areas, communities are finding that it is getting increasingly more difficult and expensive to dispose of their sewage sludge. Pumpable, chemically disinfected aqueous slurries of sewage sludge or mixtures of sewage sludge and solid carbonaceous fuel are made by the subject process containing high concentrations of sewage sludge. These pumpable slurries may be used as a fuel in a partial oxidation gas generator and may be thereby disposed of without contaminating the atmosphere. After cleaning and removal of undesirable gases e.g. $H_2O$, COS, $CO_2$, a nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace.

The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply.

Sewage sludge is obtained from raw sewage and may contain a number of pathogens known to be health hazards to humans. Almost any type of microorganism may be found in sewage, including bacteria, protozoans, viruses and fungi.

It is necessary to collect and store large quantities of sewage sludge in order to have enough to fuel a large gasifier disposal unit for a sustained period of time. This would be easier to do if it were disinfected in some manner before shipping it to a centrally located facility. We have unexpectedly found that a biocide comprising glutaraldehyde in the amount of about 0.001 to 1.0 wt. % (basis total wt. of sewage sludge) may be included in the slurry to suppress biological activity for at least four days. Such a stabilization procedure would enable sludge to be transported for long distances or stored for longer periods of time without decomposing, losing its heating value or changing its physical properties.

The chemical stabilizing additive described herein disinfects and inactivates pathogens in sludge. Unlike lime and other alkalizing agents, glutaraldehyde herein does not react with water in the sludge so as to render the sludge less pumpable and more difficult to feed to a gasifier. Further, unlike sodium compounds, there is substantially no increase in sodium concentration in the gas phase resulting from burning the sludge in a gasifier. Accordingly, there is no damage to the refractory walls lining the partial oxidation gas generator.

The slurry of sewage sludge in admixture with supplemental liquid hydrocarbonaceous and/or solid carbonaceous fuel, may be reacted with a free oxygen-containing gas by partial oxidation in a free-flow non-catalytic gas generator. Noxious sewage sludge is safely disposed of by the subject process without polluting the nation's environment. Non-contaminating ash and slag are separated from the gas stream. The ash and slag may be used for road bed fill and for making cement blocks.

Further, the subject process allows a greater amount of sewage sludge to be fed to a partial oxidation gasifier, boiler, or incinerator while requiring less energy per unit mass of sewage sludge processed. This process has the following advantages:

(a) Noxious sewage or industrial sludge is disinfected and disposed of without polluting the environment, and clean fuel gas and/or synthesis gas is produced.

(b) By-product synthesis ga may be used in the catalytic synthesis of organic chemicals e.g. methanol.

(c) The slag produced during the partial oxidation of the mixed feed of sludge and solid carbonaceous fuel is free of pollutants, and is non-hazardous. Further, it is non-leachable.

(d) The process has a high thermal efficiency. The hot effluent gas stream from the partial oxidation gas generator, furnance, or incinerator may be cooled in a waste heat boiler. Internally generated steam produced in the waste heat boiler may be used to heat the dewatered sewage sludge. The steam may be also used as the working fluid in an expansion turbine.

A typical ultimate analysis of sewage sludge is shown in Table I. A typical ultimate analysis of inert non-combustible materials in sewage sludge is shown in Table II.

TABLE I

| TYPICAL ULTIMATE ANALYSIS OF COMBUSTIBLES IN SEWAGE SLUDGE | |
| --- | --- |
| ELEMENT | WT. % |
| CARBON | 54.6 |
| HYDROGEN | 7.9 |
| NITROGEN | 4.5 |
| OXYGEN | 32.0 |
| SULFUR | 1.0 |

TABLE II

| TYPICAL ANALYSIS OF INERT NON-COMBUSTIBLE MATERIALS IN SEWAGE SLUDGE | |
| --- | --- |
| ELEMENT | MG/KG DRY SOLIDS |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 20 to 50 wt. % of solids and liquid hydrocarbonaceous or solid carbonaceous fuel e.g. coal and/or petroleum coke that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Excess water may be discharged from the system or used externally for industrial application. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 10 to 50 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

The dewatered aqueous slurry of sewage sludge having a solids content of about 10 to 50 wt. %, such as about 15 to 25 wt. %, is heated at a temperature in the range of about 150° F. to 210° F., such as about 175° F. to 200° F. in the absence of air for a period in the range of about 3 seconds to 60 minutes, such as about 5 seconds to 20 minutes, and mildly sheared by means of a rotor/mixer e.g. propeller, homogenizer, turbine having a speed in the range of about 15 to 1000 rpm, such as about 20 to 250 rpm. The rate of shear is minimum and is sufficient only to transfer the heat to the sewage sludge. The sewage sludge is heated and sheared simultaneously. A homogeneous pumpable slurry having a viscosity of less than about 2500 centipoise at 180° F, such as less than about 1500 centipoise, is thereby produced.

Optionally, about 0.01 to 5.0 wt. % (basis total wt. of sewage sludge) of an additive comprising ethylene oxide-propylene oxide nonionic copolymer having a molecular weight in the range of about 5,000 to 15,000 may be mixed with the sewage sludge at this time to improve the solids loading of the pumpable slurry. For example, a suitable additive is BASF Pluradyne ES-7478. Further, from about 0.001 to 1.0 wt. % (basis total wt. of sewage sludge) of the biocide glutaraldehyde may be optionally added during this mixing stage to minimize the biological activity of the sludge, should there be a need to store the material for a prolonged period. Shearing is a very effective way to improve the slurrying characteristics and solids content of dewatered sewage sludge. More extensive shearing of sewage sludge is treated in coassigned U.S. Pat. Nos. 4,933,086 and 4,983,296, which are incorporated herein by reference. Optionally, if necessary the water content of the slurry is adjusted by removing a small amount. Conventional dewatering equipment, for example evaporation, may be used to provide a pumpable aqueous slurry of sewage sludge having a solids content in the range of about 50 to 60 wt. %.

The profit that can be made from the subsequent burning of the pretreated sewage sludge is determined by the percentage of sewage sludge in the feed to the partial oxidation gasifier; or, alternatively in the feed to the furnace, boiler, or incinerator. Gasification of sewage sludge alone is not very efficient, as the heating value of sewage sludge is very low compared to other fuels such as coal and/or liquid hydrocarbonaceous fuel. Mixing the aqueous slurry of sewage sludge with a supplemental fuel selected from the group consisting of a liquid hydrocarbonaceous fuel, solid carbonaceous fuel e.g. coal and/or petroleum coke, and mixtures thereof having a higher heating value of at least 6,000 BTU/LB will improve the overall heating value of the slurry. The coal and/or petroleum coke have a particle size so that 100% passes through an ASTM E11-70 Sieve Designation Standard (SDS) 1.40 mm Alternative No. 14, such as 425 μm Alternative No. 40. Gasification of such mixtures are thereby rendered highly viable. Accordingly, the solids content of the pretreated aqueous slurry of sewage sludge is increased by mixing with it at least one of the following materials: liquid hydrocarbonaceous fuel, solid carbonaceous fuel-containing material, and mixtures thereof. The solid carbonaceous fuel-containing material is an aqueous slurry of coal and/or petroleum coke having a solids content in the range of about 45 to 80 wt. %, dried coal and/or petroleum coke having a solids content in the range of about 77 to 100 wt. %, and mixtures thereof. The aforesaid liquid hydrocarbonaceous fuel and/or solid carbonaceous fuel-containing material are mixed with the sheared dewatered pumpable slurry of sewage sludge and optionally, with an additive that prevents the increase in sludge slurry viscosity during storage and transport and which increases the solids content of the pumpable aqueous slurry. The solids content of the pumpable aqueous slurry of sewage sludge is about 10 to 50 wt. %. The parts by weight of supplemental solid carbonaceous fuel and/or liquid hydrocarbonaceous fuel to pumpable slurry of dewatered sewage sludge are respectively in the range of about 5-7 to 0.5-7. For example, there may be about 6 parts by wt. of solid carbonaceous fuel to 2 parts by wt. of pumpable slurry of dewatered sewage sludge. The aforesaid materials are mixed together at a temperature in the range of about ambient to 200° F., such as about 150° F. to 195° F. A pumpable slurry of sewage sludge and supplemental fuel is produced having a solids content in the range of about 50 to 65 wt. %, such as about 54 to 60 wt. %, and having a higher heating value in the range of about 6,000 to 18,000 BTU/LB, such as about 7,000 to 10,000 BTU/LB. In one embodiment, the materials are mixed together for a time which is less than 5 minutes.

The term liquid hydrocarbonaceous fuel as used herein is intended to include various liquid hydrocarbon materials, such as those selected from the group consisting of liquified petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operation, furfural extract of coker gas oil, and mixtures thereof. The term "coal" as used herein is intended to mean a material selected from the group consisting of anthracite, bituminous, lignite, residue derived from coal liquefaction, shale, asphalt, and mixtures thereof. The term "petroleum coke" is used herein in its conventional manner and includes petroleum coke made by conventional delayed or fluid coking processes. The term "and/or" is used herein in its normal sense. For example, "A and/or B" means either A or B, or A and B.

In a preferred embodiment, the fuel feedstream, for example the aqueous slurry of sewage sludge and coal and/or petroleum coke and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of pretreated sewage sludge and liquid hydrocarbonaceous fuel and/or solid carbonaceous fuel e.g. coal and/or petroleum coke is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportions of solid or liquid fuels, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1-35 atmospheres. Preferably the temperature in the gasifier is in the range of about 2200° F. to 2800° F., so that molten slag is produced.

The dwell time in the reaction zone is in the rang of about 1 to 10 seconds, and preferably in the range of about 2 to 8 seconds. With substantially pure oxygen feed to the partial oxidation gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, 1 $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifer or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag maybe removed by quenching the process gas stream in a conventional quench tank and/or by scrubbing. See coassigned U.S. Pat. Nos. 3,232,728; 3,524,630; and 4,801,307, which are incorporated herein by reference.

Although modifications and variations of the invention may be made without departing from the spirit and scope thereof, only such limitations should be imposed as are indicated in the appended claims.

We claim:

1. A process for disposing of sewage sludge comprising:
    (1) dewatering an aqueous slurry of sewage sludge having a solids content of at least 3 wt. % to produce an aqueous slurry of sewage sludge having a solids content in the range of about 10 to 50 wt. %;
    (2) simultaneously, heating and shearing the aqueous slurry of sewage sludge from (1) at a temperature in the range of about 175° F. to 200° F. in the absence of air for a period in the range of about 3 seconds to 60 minutes by means of a rotor/mixer having a speed in the range of about 20 to 250 rpm sufficient to transfer heat to the sewage sludge without hydrothermal modification of the sludge, thereby producing a pumpable slurry of sewage sludge having a viscosity of less than about 2500 centipoise at 180° F.;
    (3) mixing at a temperature in the range of about ambient to 200° F. the slurry of sewage sludge from (2) with a supplemental fuel selected from the group consisting of solid carbonaceous fuel having a solids content of about 77 to 100 wt. %, an aqueous slurry of solid carbonaceous fuel having a solids content in the range of about 45 to 80 wt. %, a liquid hydrocarbonaceous material, and mixtures thereof; wherein a pumpable slurry of sewage sludge and said supplemental fuel is produced having a solids content in the range of about 50 to 65 wt. % and a higher heating value in the range of about 6,000 to 18,000 BTU/LB; wherein about 0.01 to 5.0 wt. % (basis total weight of sewage sludge) of ethylene oxide-propylene oxide nonionic copolymer having a molecular weight in the range of about 5000 to 15,000 is introduced into (2) and/or (3) to increase the pumpability of the material being processes; and
    (4) burning said pumpable slurry from (3) in a partial oxidation gasifier, furnace, boiler, or incinerator to produce an effluent gas stream.

2. The process of claim 1 provided with the steps of washing and purifying the effluent gas stream from (4) and separating non-polluting ash and slag to prevent contaminating the environment.

3. The process of claim 1 where in (3), about 5 to 7 parts by wt. of supplementary fuel are mixed with 0.5 to 7 parts by wt. of said pumpable slurry of sewage sludge from (2).

4. The process of claim 1 provided with the step of dewatering the slurry of sewage sludge from (2) to produce a pumpable slurry of sewage sludge having a solids content in the range of about 50 to 60 wt. %.

5. The process of claim 4 wherein said sewage sludge is dewatered by evaporation.

6. The process of claim 1 wherein the mixing in (3) takes place for a time which is for less than 5 minutes.

7. The process of claim 1 wherein the mixing in (3) takes place at a temperature in the range of about 150° F. to 195° F.

8. The process of claim 1 provided with the steps of cleaning and purifying the effluent gas stream from (4) and separating out non-contaminating fly-ash and slag.

9. The process of claim 1 where in (4) said pumpable slurry is burned in a partial oxidation gasifier with a free-oxygen containing gas at a temperature in the range of about 1800° F. to 3500° F., a pressure in the range of about 1 to 35 atmospheres, a weight ratio of $H_2O$ to carbon in the feed in the range of about 0.2 to 3.0, and an atomic ratio of free-oxygen to carbon in the range of about 0.85 to 1.5 to produce an effluent stream of synthesis gas, reducing gas or fuel gas.

* * * * *